Figure 1:
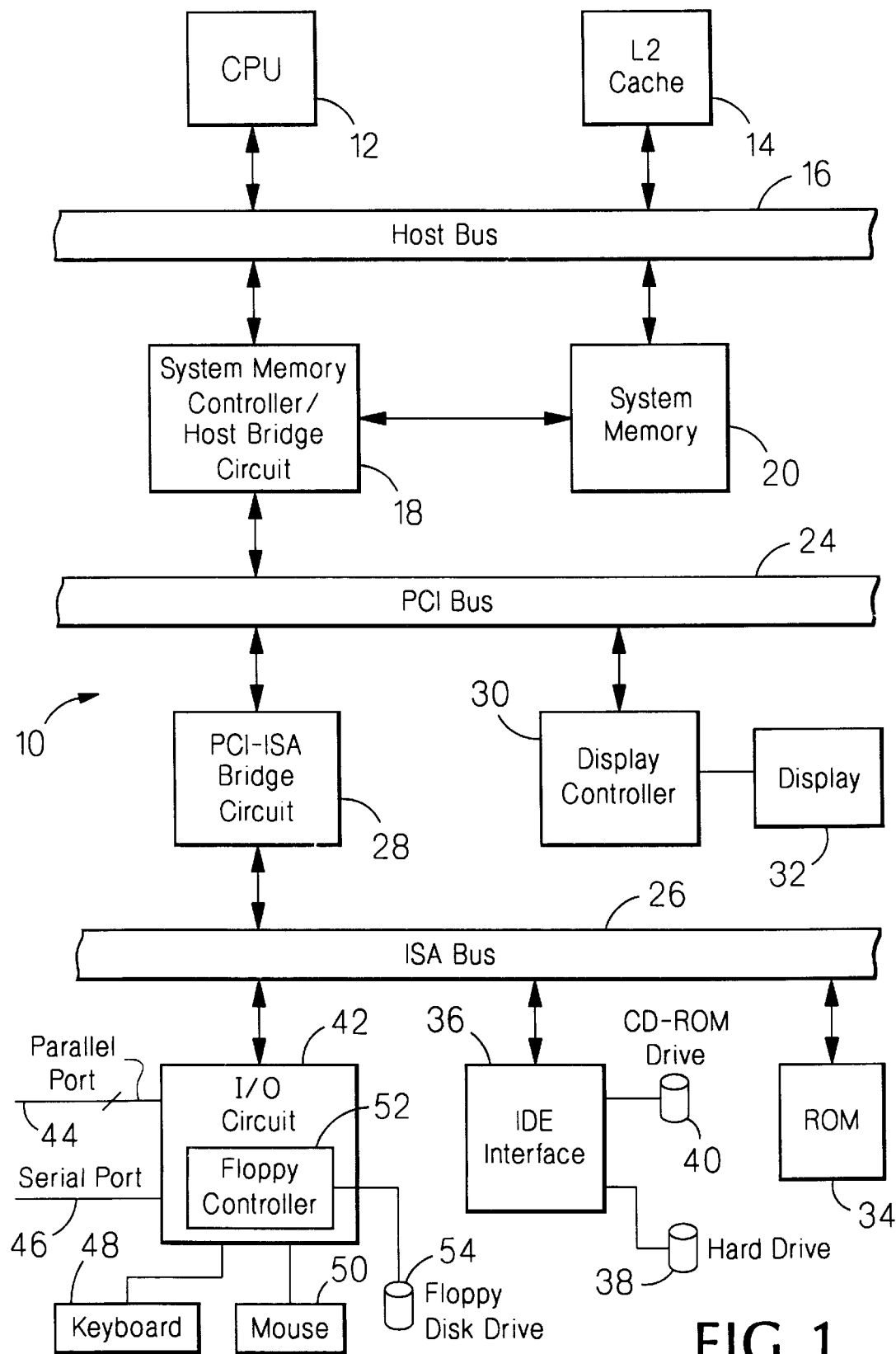

United States Patent
Moore et al.

[11] Patent Number: 5,835,297
[45] Date of Patent: Nov. 10, 1998

[54] DETECTING DISKETTE INSERTION

[75] Inventors: Mark D. Moore, Palo Alto; Bradley Alan Silen, Sausalito; Paul Beard, Milpitas, all of Calif.

[73] Assignee: Compaq Computer Corp., Houston, Tex.

[21] Appl. No.: 778,389

[22] Filed: Dec. 31, 1996

[51] Int. Cl.[6] .............................. G11B 15/18; G11B 3/90
[52] U.S. Cl. ............................................... 360/69; 369/53
[58] Field of Search .............................. 360/69, 137, 71, 360/73.03, 61, 67; 369/47, 48, 49, 50, 54, 58, 53

[56] References Cited

PUBLICATIONS

Apple Computer, Inc., *Macintosh SE Manual*, 1–252 (1987).
Apple Computer, Inc., *Macintosh SE Manual*, 1–11, 188 (1987).

*Primary Examiner*—Paul W. Huber
*Attorney, Agent, or Firm*—Paul N. Katz; Ronald L. Chichester

[57] ABSTRACT

A method, apparatus and computer system for detecting the insertion of a medium in a medium drive, including applying energy to a drive motor of the medium drive; changing the state of a medium change signal, in response to the energy, to reflect the presence of a medium in the medium drive; and relaxing the energy before the drive motor turns.

21 Claims, 2 Drawing Sheets

DETECTING DISKETTE INSERTION

BACKGROUND

This invention relates to detecting diskette insertion.

Almost from their inception, personal computers have included floppy disk drives. Floppy disks provide an easy and convenient means to transfer data to and from the computer. For example, vendors frequently provide their software, such as word processing, spreadsheet or database software, on diskette. The software is transferred from the diskette to the computer through the disk drive. Frequently, loading such applications onto a computer requires reading data from more than one diskette. When all of the data is loaded from the first diskette, the computer prompts the user to insert the next diskette and to press a key. The computer does not automatically know when the diskette is inserted.

Under Microsoft Corporation's WINDOWS 95 operating system, the computer and the operating system are aware when a new CD-ROM is inserted in the CD-ROM drive and the operating system displays on the screen an icon representing the newly-inserted CD-ROM. Similarly, MACINTOSH computers manufactured by Apple Computer, Inc. display an icon when a diskette or a CD-ROM is inserted in their respective drives. In both cases, hardware within the disk drive detects the insertion of the media and reports it to the operating system, which displays an icon on the screen.

SUMMARY

In general, in one aspect, the invention features a method for detecting the insertion of a medium in a medium drive, comprising applying energy to a drive motor of the medium drive; changing the state of a medium change signal, in response to the energy, to reflect the presence of a medium in the medium drive; and relaxing the energy before the drive motor turns.

Implementations of the invention may include one or more of the following. The medium drive may comprise a disk drive. The disk drive may be a floppy disk drive. The medium may be a diskette. The method may further comprise detecting the change in state of the medium change signal. The method may further comprise displaying an indication of the change in state of the medium change signal on a display. The method may further comprise relaxing the energy after the state of the medium change signal changes.

In general, in another aspect, the invention features an apparatus for detecting the insertion of a medium in a medium drive, comprising a medium pulse source configured to deliver a medium pulse; and a medium change signal source, responsive to the medium pulse source, configured to deliver a medium change signal to reflect the presence of a medium in the medium drive.

Implementations of the invention may include one or more of the following. The medium pulse may be delivered to a drive motor in the medium drive. The medium pulse may have a length insufficient to turn a drive motor but sufficient to affect the medium change signal. The drive motor may comprise an inductive load. The apparatus may further comprise a medium register responsive to the medium change signal, configured to store an indication of the presence of a medium in the medium drive. The apparatus may further comprise a display; and a processor configured to read the medium register and indicate on the display the presence of a medium in the medium drive.

In general, in another aspect, the invention features a computer system comprising a disk drive comprising a drive motor; a drive motor pulse source configured to deliver a drive motor pulse to the drive motor; a disk change signal, responsive to the drive motor pulse, configured to reflect the presence of a disk in the disk drive; and the drive motor pulse having a length insufficient to turn the drive motor but sufficient to affect the disk change signal.

In general, in another aspect the invention features a computer system, comprising a processor; a mass storage device connected to the processor through a bus system; a floppy controller connected to the processor through the bus system; a floppy drive connected to the floppy controller; the floppy drive comprising a drive motor; the floppy controller comprising a drive motor pulse source configured to deliver a drive motor pulse to the drive motor; a disk change signal, responsive to the drive motor pulse, configured to reflect the presence of a disk in the disk drive; and the drive motor pulse having a length insufficient to turn the drive motor but sufficient to affect the disk change signal.

Implementations of the invention may include one or more of the following. The floppy controller may further comprise a disk register configured to store an indication of the presence of a disk in the disk drive. The processor may be configured to read the disk register and indicate on a display the presence of a disk in the disk drive.

Advantages of the invention may include one or more of the following.

The invention may improve the interface between the computer and the user by indicating to the user the presence of a disk in the disk drive. Consequently, the system will require user confirmation of floppy disk insertion only when such confirmation is appropriate.

DESCRIPTION

Figure 2:
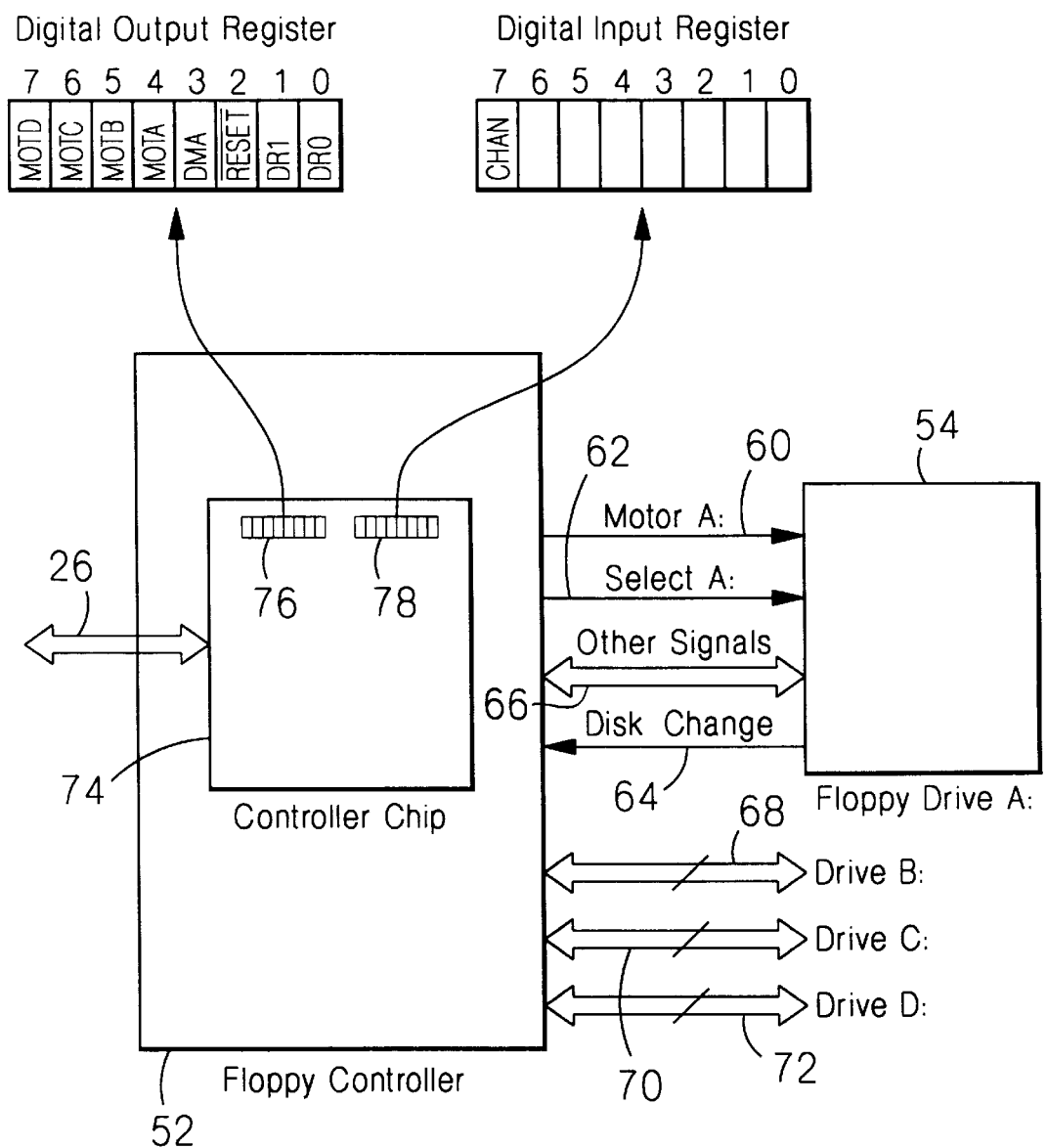

FIGS. 1 and 2 are block diagrams.

A computer system 10 includes a CPU 12 and cache 14 which are coupled to a host bus 16, as shown in FIG. 1. Also coupled to the host bus 16 are the system memory 20 and a system memory controller/host bridge circuit 18. The computer system 10 has a Peripheral Component Interconnect (PCI) bus 24 which is interfaced to an Industry Standard Architecture (ISA) bus 26 via a PCI-ISA bridge circuit 28. Also coupled to the PCI bus 24 is a display controller 30 which controls a display 32. The ROM 34 is coupled to the ISA bus 26 along with an intelligent device electronics (IDE) interface 36 which controls the hard disk drive 38 and a CD-ROM drive 40. The computer system 10 further includes an input/output (I/O) circuit 42 which provides a parallel port 44 and a serial port 46. The I/O circuit 42 also receives input from a keyboard 48 and a mouse 50, and the I/O circuit 42 includes a floppy controller 52 which interfaces a floppy drive 54 to the computer system 10.

The floppy drive communicates with the floppy controller through a group of signals, as shown in FIG. 2. The "Motor A:" signal 60 causes a drive motor in the floppy drive to energize and begin turning, causing the media in the floppy drive to turn as well. The "Select A:" signal 62 selects the floppy drive for communication with the floppy controller. Activation of the Select A: signal causes the "Disk Change" signal 64 to reflect whether a disk is present in the floppy drive. The floppy drive also uses other signals 66 to communicate with and transfer data to and from the floppy controller. The floppy controller has similar suites of signals 68, 70 and 72 to communicate with drives B:, C:, and D:, respectively, assuming such drives exist.

The floppy controller comprises a controller chip 74, which communicates with the rest of the computer via the ISA bus 26. It generates the Motor A:, Select A:, Disk Change and other signals between the floppy controller and the disk drives connected to the computer. The controller chip comprises two registers: a digital output register 76 and a digital input register 78. Each register has 8 bits, as shown in the exploded representations of the registers on FIG. 2. The digital output register is a write-only register. Bits 7, 6, 5 and 4 of the digital output register are the "MOTD," "MOTC," "MOTB," and "MOTA" signals, which turn on the motors of drives D:, C:, B: and A:, respectively, assuming the corresponding drive has been selected using the DR0 and DR1 bits, discussed below. Bit 3 of the digital output register, the DMA bit, enables the direct memory access channel on the floppy controller. Bit 2, the "REST" bit, resets the controller if it is asserted. Bits 1 and 0, the "DR1" and "DR0" bits, are used to select the drive to be communicated with. If both bits are zero, the communication is with drive A:; if DR0 is set to one and DR1 is set to zero, the communication is with drive B:; if DR0 is set to zero and DR1 is set to one, the communication is with drive C:; and if both bits are set to one, the communication is with drive D:.

Bit 7 of the digital input register, the "CHAN" bit, reflects whether a disk change has occurred in the disk drive being accessed (as designated by bits DR0 and DR1 in the digital output register). Bits 0–6 of the digital input register, used in some computers but not in others, are not important to this invention.

Early in the development of the IBM PC and its floppy controller, it was decided to tie the Motor A: signal to the Select A: signal and to assert both only when the DR0 and DR1 bits are configured to select floppy drive A: and the MOTA signal is set to one.

One strategy for determining whether a floppy has been inserted into floppy drive A: is to assert the Select A: signal and observe the disk change signal as reflected in bit 7 of the digital input register. This is accomplished by asserting the Select A: signal, which causes the Disk Change signal to be affected, which is reflected in the CHAN bit of the digital input register.

Unfortunately, when the Select A: signal is asserted, the Motor A: signal (which is tied to the Select A: signal) is also asserted, which causes the drive A: motor to energize, spinning the disk inserted in the disk drive. If the purpose of this process is to determine whether a media has been inserted, for example, in order to place an icon on the computer screen or to perform some other function to tell the user of the computer that a disk has been inserted in the floppy drive, the intermittent actuation of the floppy drive motor would be distracting. Furthermore, in laptop systems, such an activity would consume valuable power, causing the battery to be depleted more quickly.

A floppy drive motor, like all motors and other inductive loads, does not react instantly to the application of power. Instead, it takes a small period of time (on the order of a few milliseconds) for the motor to begin turning after power is applied to it. The invention takes advantage of this delay by turning the Motor A: signal on and off quickly enough that the motor does not have time to begin turning.

When the system desires to determine whether a diskette has been inserted in the floppy drive, the DR0 and DR1 bits are set to zero and the MOTA bit is set to one, causing both the Motor A: and the Select A: signals to be asserted. The Select A: signal causes the Disk Change signal to be affected, reflecting the status of whether a disk is inserted in the floppy drive. After a few microseconds, the CHAN bit in the digital input register on the floppy controller reflects the new status of the Disk Change signal.

At the same time that the Select A: signal is asserted, the Motor A: signal is also asserted, which causes the floppy drive motor to begin to be energized. Before the floppy drive's motor begins to turn, however, the computer reads the digital input register, with the CHAN bit reflecting the status of the Disk Change signal, and sets the MOTA bit to zero so that the Motor A: and Select A: signals are relaxed. This causes the energization of the floppy drive's motor to cease before the motor begins to turn. Consequently, the computer is able to determine whether a floppy has been inserted in the floppy drive A: without causing the motor in the floppy drive to turn.

Other embodiments are within the scope of the following claims. For example, the Motor A: and Select A: signals on the floppy controller could be separated so that they can be independently asserted. With that modification, the floppy drive could be selected without causing the motor to turn.

What is claimed is:

1. A method for detecting the insertion of a medium in a medium drive, comprising
    applying energy to a drive motor of the medium drive;
    changing the state of a medium change signal, in response to the energy, to reflect the presence of a medium in the medium drive; and
    relaxing the energy before the drive motor turns.

2. The method of claim 1, wherein the medium drive comprises a disk drive.

3. The method of claim 2, wherein the disk drive is a floppy disk drive.

4. The method of claim 1, wherein the medium is a diskette.

5. The method of claim 1, further comprising
    detecting the change in state of the medium change signal.

6. The method of claim 5, further comprising
    displaying an indication of the change in state of the medium change signal on a display.

7. The method of claim 1, further comprising relaxing the energy after the state of the medium change signal changes.

8. An apparatus for detecting the insertion of a medium in a medium drive, comprising
    a medium pulse source configured to deliver a medium pulse to a drive motor in the medium drive, the medium pulse configured to be insufficient to turn the drive motor; and
    a medium change signal source, responsive to the medium pulse, configured to deliver a medium change signal to reflect the presence of a medium in the medium drive.

9. The apparatus of claim 8, wherein the drive motor comprises an inductive load.

10. The apparatus of claim 8, further comprising
    a medium register responsive to the medium change signal, configured to store an indication of the presence of a medium in the medium drive.

11. The apparatus of claim 10, further comprising
    a display; and
    a processor configured to read the medium register and indicate on the display the presence of a medium in the medium drive.

12. A computer system comprising
    a disk drive comprising a drive motor;
    a drive motor pulse source configured to deliver a drive motor pulse to the drive motor;
    a disk change signal, responsive to the drive motor pulse, configured to reflect the presence of a disk in the disk drive; and the drive motor pulse having a length insufficient to turn the drive motor but sufficient to affect the disk change signal.

13. A computer system, comprising a processor;

a mass storage device connected to the processor through a bus system;

a floppy controller connected to the processor through, the bus system;

a floppy drive connected to the floppy controller;

the floppy drive comprising a drive motor;

the floppy controller comprising a drive motor pulse source configured to deliver a drive motor pulse to the drive motor;

a disk change signal, responsive to the drive motor pulse, configured to reflect the presence of a disk in the disk drive; and the drive motor pulse having a length insufficient to turn the drive motor but sufficient to affect the disk change signal.

14. The computer system of claim 13, wherein the floppy controller further comprises a disk register configured to store an indication of the presence of a disk in the disk drive.

15. The computer system of claim 14, wherein the processor is configured to read the disk register and indicate on a display the presence of a disk in the disk drive.

16. A computer program, residing on a computer readable medium, comprising instructions for causing a computer to:

apply energy to a drive motor of a medium drive;

change the state of a medium change signal, in response to the energy, to reflect the presence of a medium in the medium drive; and relax the energy before the drive motor turns.

17. The computer program of claim 16, further comprising instructions to detect the change in state of the medium change signal.

18. The computer program of claim 17, further comprising instructions to relax the energy after detecting the change in state of the medium change signal.

19. The computer program of claim 17, further comprising instructions to display an indication of the change in state of the medium change signal.

20. The computer program of claim 16, wherein the computer readable medium is a read only memory.

21. The computer program of claim 20, wherein the computer readable medium is incorporated within a floppy disk drive controller.

* * * * *